(12) United States Patent
Crevling, Jr.

(10) Patent No.: US 8,179,004 B2
(45) Date of Patent: May 15, 2012

(54) MOTOR ASSEMBLY WITH SWITCH MODULE

(75) Inventor: Robert L. Crevling, Jr., Williamsport, PA (US)

(73) Assignee: Shop VAC Corporation, Williamsport, PA (US)

( * ) Notice: Subject to any disclaimer, the term of this patent is extended or adjusted under 35 U.S.C. 154(b) by 209 days.

(21) Appl. No.: 12/614,098

(22) Filed: Nov. 6, 2009

(65) Prior Publication Data

US 2011/0109177 A1    May 12, 2011

(51) Int. Cl.
*H02K 11/00* (2006.01)
(52) U.S. Cl. ............ 310/71; 310/68 A; 310/89; 439/638
(58) Field of Classification Search ................ 310/68 A, 310/71, 89; 439/638; *H02K 11/00*
See application file for complete search history.

(56) References Cited

U.S. PATENT DOCUMENTS

| | | | |
|---|---|---|---|
| 2,901,564 A | 8/1959 | Erik et al. | |
| 3,919,573 A | 11/1975 | Schmuck | |
| 4,135,171 A * | 1/1979 | Violet | 366/60 |
| 4,181,393 A * | 1/1980 | Lill | 439/402 |
| 4,442,366 A * | 4/1984 | Cuneo | 310/50 |
| 4,569,125 A | 2/1986 | Antl et al. | |
| 5,130,587 A * | 7/1992 | Janisse et al. | 310/89 |
| 5,150,499 A | 9/1992 | Berfield | |
| 5,204,566 A * | 4/1993 | Borgen et al. | 310/71 |
| 5,544,274 A | 8/1996 | Walker et al. | |
| 5,565,720 A * | 10/1996 | Janisse et al. | 310/68 A |
| 6,548,924 B2 * | 4/2003 | Furukawa et al. | 310/68 C |
| 6,577,030 B2 * | 6/2003 | Tominaga et al. | 310/68 B |
| 6,610,952 B2 | 8/2003 | Crevling | |
| 6,802,741 B1 | 10/2004 | Shatkin | |
| 2002/0055306 A1 * | 5/2002 | Jenks | 439/855 |
| 2003/0184172 A1 * | 10/2003 | Ghiotto | 310/89 |
| 2004/0137796 A1 * | 7/2004 | Sivertsen | 439/638 |
| 2005/0040715 A1 * | 2/2005 | Nesic | 310/71 |
| 2008/0135268 A1 * | 6/2008 | Tadokoro et al. | 173/2 |
| 2008/0252160 A1 * | 10/2008 | Kavalsky et al. | 310/71 |
| 2011/0109177 A1 * | 5/2011 | Crevling, Jr. | 310/71 |

FOREIGN PATENT DOCUMENTS

DE  3924032   10/1990
EP  0129754 A1  1/1985

* cited by examiner

*Primary Examiner* — John K Kim
(74) *Attorney, Agent, or Firm* — Marshall, Gerstein & Borun LLP

(57) ABSTRACT

A new motor assembly uses a switch module to facilitate the assembly of an electric motor. The switch module can be prefabricated, and is connected to a terminal block on the motor by plug and socket connectors on the terminal block and on a terminal end of the module. The switch module is pre-wired with a power inlet and a switch, eliminating the need for a worker on the motor assembly line to make difficult electrical connections to a traditional terminal block. The switch is arranged in a switch housing that fits within an extension on the motor housing. An interior support wall on the housing fits within a channel between the switch housing and the rest of the switch module, helping to hold the assembly in position. The power inlet is positioned laterally outward from the terminal end and laterally inward of the switch.

8 Claims, 6 Drawing Sheets

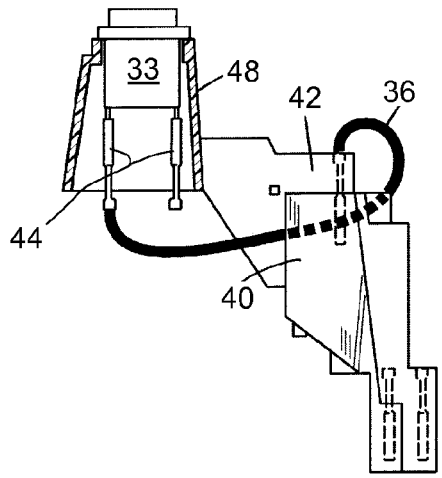
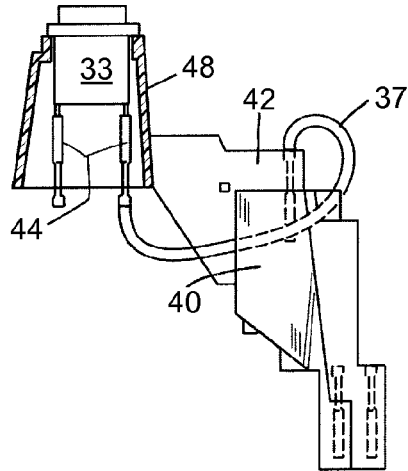
FIG. 4A
FIG. 4B
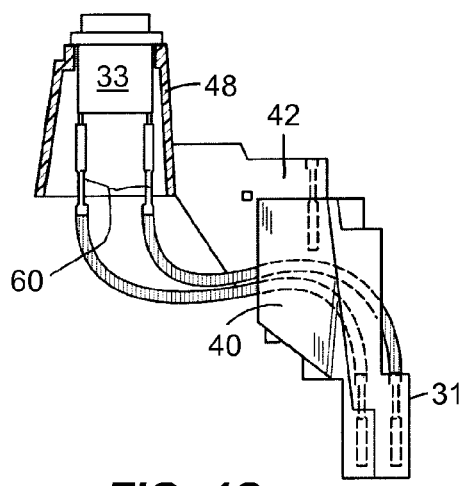
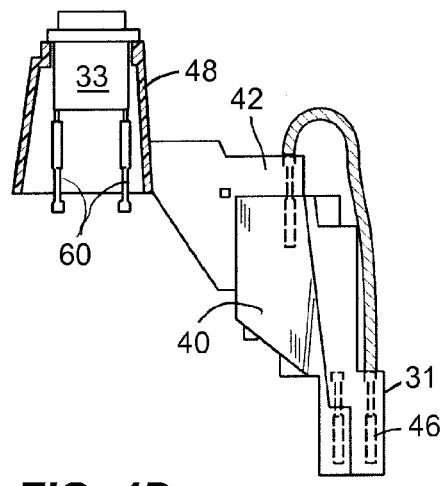
FIG. 4C
FIG. 4D

MOTOR ASSEMBLY WITH SWITCH MODULE

FIELD OF THE INVENTION

This invention relates to electric motors and specifically to the assembly of electric motors used in household appliances such as vacuum cleaners.

BACKGROUND OF THE INVENTION

Terminal blocks are commonly used in motor assemblies to facilitate the connection between groups of wires. These terminal blocks are typically physically attached to the winding board of a motor assembly early in the assembly process. To connect a wire to the terminal block, a worker strips insulation from the wire and connects the exposed end to the block. For example, when using a screw terminal type electrical connector, a worker strips the sheathing from the end of the wire and then clamps the wire to the metal surface of the block using a screw. This process is carried out within a relatively confined space, and specific clamping and wire routing tools are often needed to perform the task properly and safely.

The applicants have found a way to facilitate the wiring connections in a motor assembly.

SUMMARY OF THE DISCLOSURE

The present invention facilitates assembly of an electric motor by preassembling specific electrical components, including the power switch, in a new switch module.

One embodiment of the disclosed switch module has a terminal end and a power end. The terminal end slides onto a winding board of the motor, electrically connecting wires within the assembly to a terminal block on the winding board. The power end is connected to a power source. Wiring within the assembly replaces wiring connections that would otherwise need to be made under difficult conditions on the motor assembly line. By using a prefabricated switch module that includes many of the required electrical connections that would otherwise by made on the motor assembly line, production times can be improved. Plug-and-socket connectors on the assembly can make it easier to complete the few remaining connections that need to be made on the assembly line.

BRIEF DESCRIPTION OF THE DRAWINGS

FIG. 4A is a cross-sectional side view of the switch module taken though section 4A-4A in FIG. 2, with only the black power-associated conductor connected.

FIG. 4B is another cross-sectional side view of the same section of the switch module, with only the white power-associated conductor connected.

FIG. 4C is another cross-sectional view of the switch module taken through section 4C-4C in FIG. 2, with only the intermediary connectors connected.

FIG. 4D is a cross-sectional side view of the same section of the switch module, with only the ground lead connected.

DETAILED DESCRIPTION OF A PREFERRED EMBODIMENT

Figure 1:
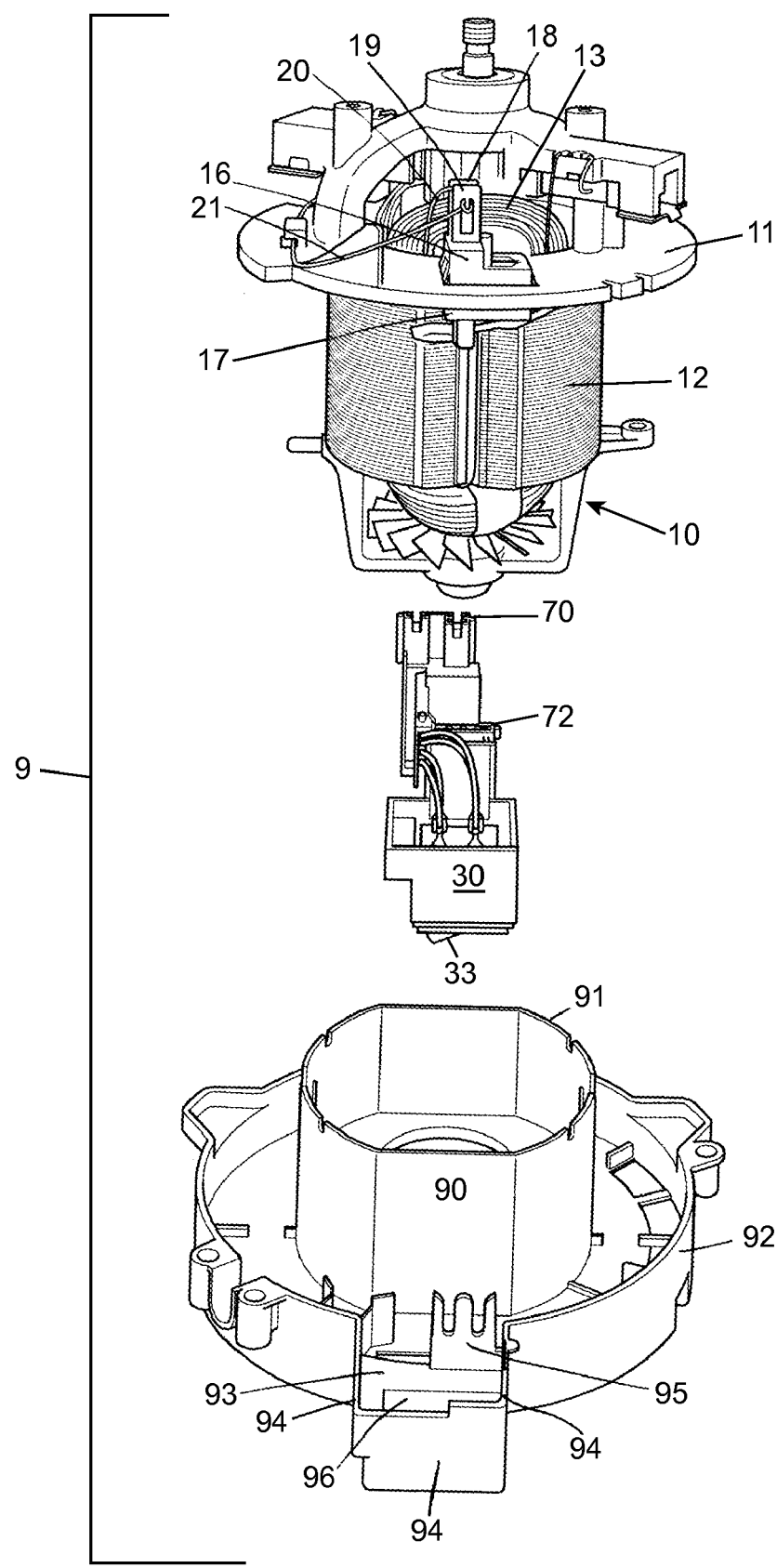
FIG. 1 is an exploded orthographic view of one example of a motor assembly that uses the invention.

FIG. 1 shows a motor assembly 9 that has a motor 10, a new switch module 30, and a housing 90. The illustrated motor assembly 9 is for a vacuum cleaner, but the invention may also be used in connection with motors and motor assemblies used in other consumer products.

Like many motor assemblies, the illustrated motor assembly 9 has a conventional winding board 11, a stator 12, and a set of coils 13. An upper terminal block 16 is used to supply electrical current to the motor 10, and is disposed on an upper face of the winding board 11. This upper terminal block 16 can take many forms. The illustrated upper terminal block 16 has two tangs, a first internal tang 18 and a second internal tang 19. The first internal tang 18 is electrically connected to the coils 13 by a first wire 20. The second internal tang 19 is electrically connected to an opposite end of the coil 13 by a second wire 21.

Unlike prior motor assemblies, the illustrated assembly 9 also has a lower terminal block 17 mounted on the opposite side of the winding board, directly opposed to the upper terminal block 16. This lower terminal block 17 has one lead that is electrically connected to the first internal tang 18 on the upper terminal block 16 and another lead that is electrically connected to the second internal tang 19 on the upper terminal block 16.

As explained in more detail later, the new switch module 30 slidably connects to the lower terminal block 17 and, as described next, contains wiring for a power switch 33 that would conventionally be connected by a worker on the motor assembly line.

The Switch Module

Figure 2:
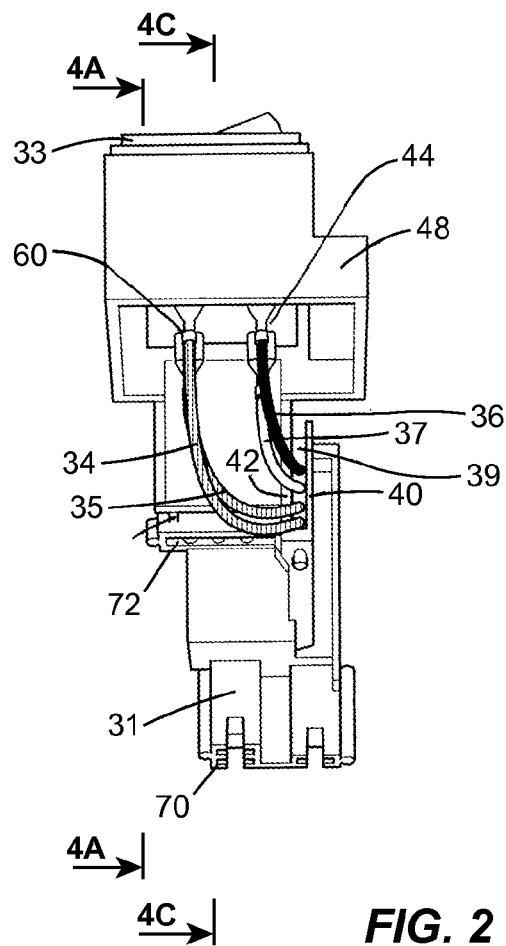
FIG. 2 is one end view of a removable switch module used in the motor assembly.
Figure 3:
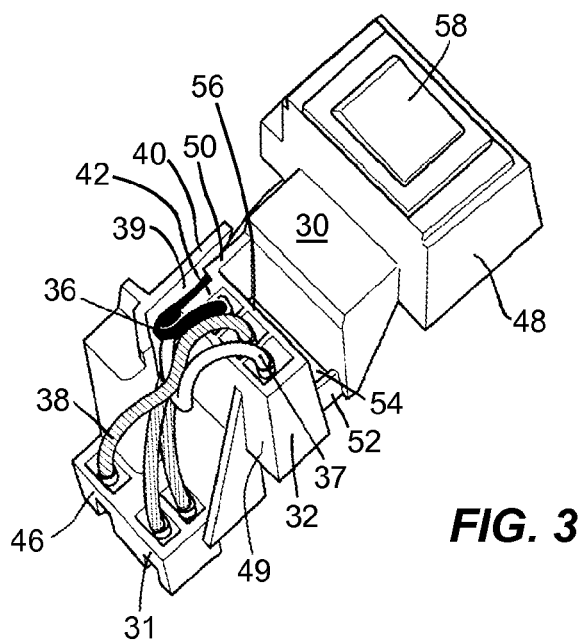
FIG. 3 is a side elevation of the switch module.

FIGS. 2-4 show the arrangement of the switch module 30 in detail. As seen in the figures, this illustrated switch module 30 has a power inlet 32, two power-associated wires 36, 37, a ground lead 38, a switch 33, two intermediary wires 34, 35, and a terminal end 31.

The power inlet 32 (seen in FIG. 3) enables power to be drawn from a power source (not shown) to the motor assembly 9. The illustrated power inlet is a conventional three-prong male terminal with separate hot (black), neutral (white), and ground (green) leads. It is arranged so that a mating female connector can slide onto the inlet from a power connection position that will be described in more detail below. Other types of inlets can also be used.

The two power-associated wires 36, 37 and the ground lead 38 are connected at one end to the leads on the power inlet 32. The power-associated wires (a hot wire and a neutral wire) extend through an optional slot 39 that is, in this example, formed between a panel 40 and a frame 42 for the power inlet 32. As seen in FIG. 2 and in FIGS. 4A and 4B, the opposite ends of these wires are connected to a first switch terminal 44 on the switch 33. As seen in FIG. 4D, the ground lead 38 runs from the power inlet 32 to a ground terminal 46 on the terminal end 31.

As seen in FIG. 3, the illustrated switch 33 is mounted in a switch housing 48 that is spaced about 1/8" from the power inlet 32. The switch housing 48 that is shown here is connected to the power inlet by two connecting walls 50, 52 that form the ends of an approximately 5/8" by 1/8" channel 54 that separates the switch housing from an outside wall 56 of the frame 42 of the power inlet 32. While other arrangements can be used, this channel can provide benefits described below.

Although other types of switches can also be used, the switch 33 that is seen in FIG. 2 has a two-position actuator 58 that moves between a first position and a second position. When the switch is in an "on" position, current can flow from the first switch terminal 44 through to a second switch terminal 60 on the switch. When the switch is in an "off" position, the circuit is closed and current cannot flow to the second switch terminal.

That second switch terminal 60 on the switch 33 is connected to the two intermediary wires 34, 35 that form an intermediary conductor that extends, as seen in FIG. 4C, through the optional slot 39 to the terminal end 31.

As seen in FIG. 3, the illustrated terminal end 31 is connected to an outside wall 49 of the power inlet 32. As oriented in FIG. 2, the access end 70 of the terminal end 31 (the end of the terminal end that is connected to the terminal block 17 on the winding board) is arranged 1-2" below an access end 72 of the power inlet 32 (where a power supply enters the power inlet). Although other arrangements are possible, this axial offset of the access ends can facilitate assembly, as described in more detail below.

Instead of extending two power-associated wires 36, 37 from the power inlet 32 to the switch 33, and two intermediary conductors 34, 35 from the switch to the terminal end 31, in some circumstances other arrangements could be used.

Figure 5:
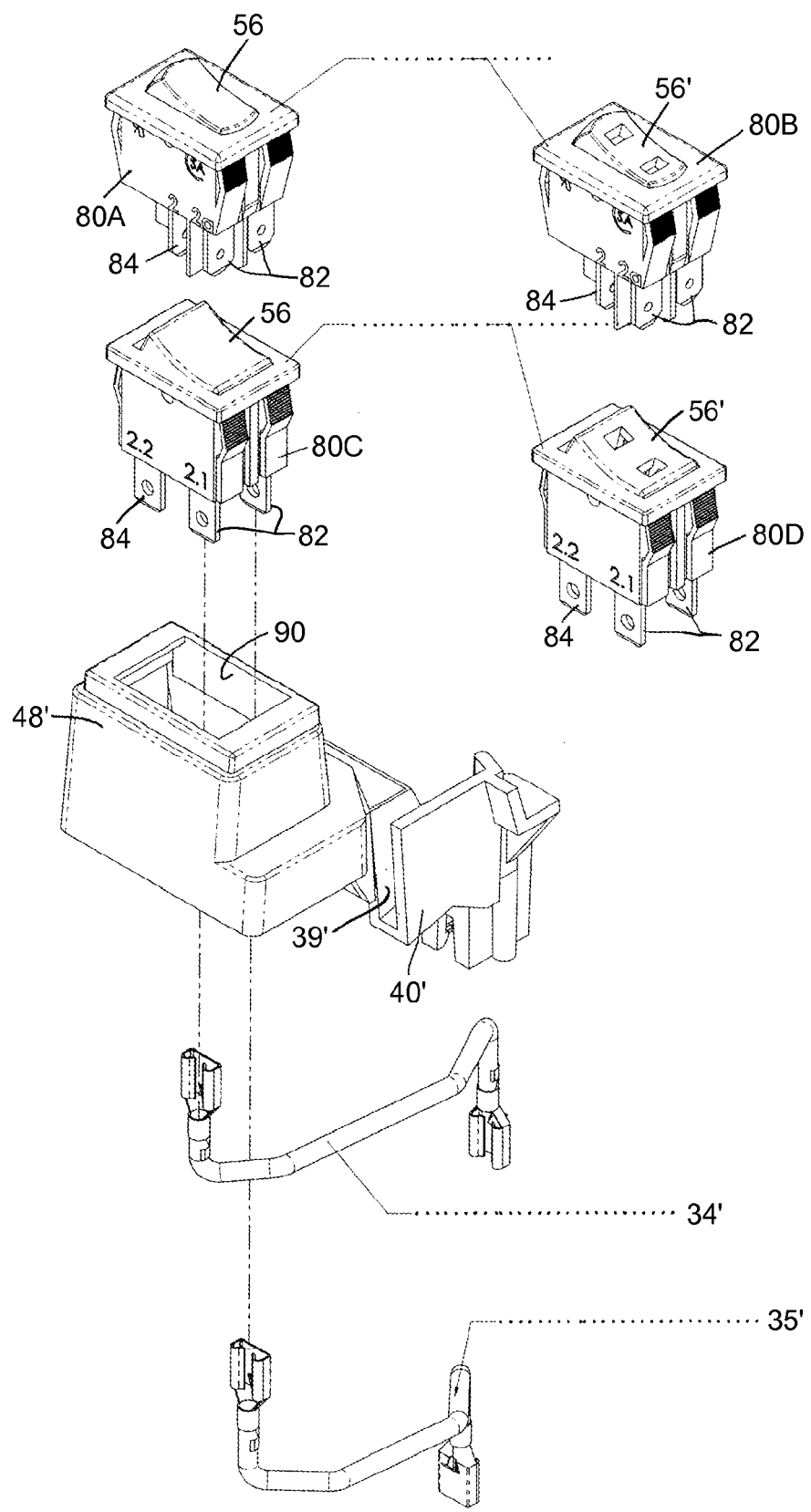
FIG. 5 is an exploded orthographic view of an alternative version of a switch module, with four alternative switches.
Figure 6:
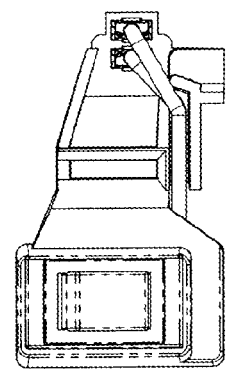
FIG. 6 is a top plan view of the module seen in FIG. 5.
Figure 7:
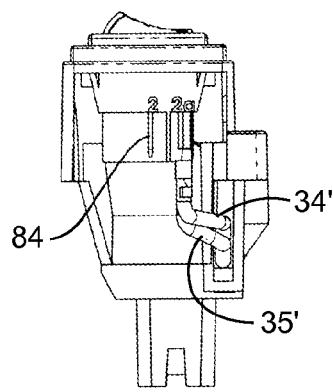
FIG. 7 is a cross-sectional side view of the module with one of the switches.
Figure 8:
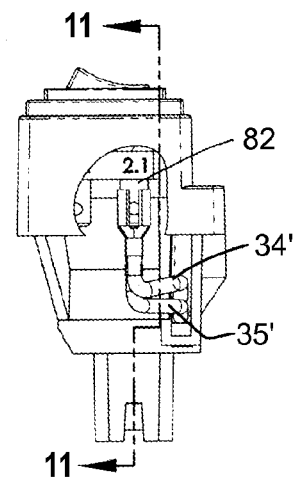
FIG. 8 is a cross-sectional side view of the module with another one of the switches.
Figure 9:
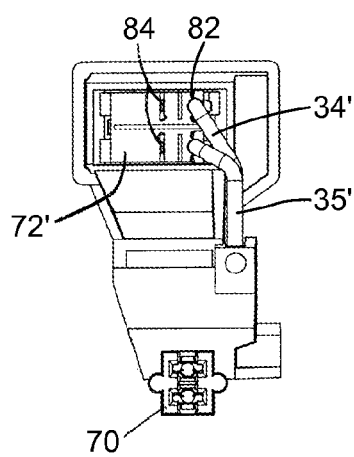
FIG. 9 is a bottom plan view of the module seen in FIG. 7.
Figure 10:
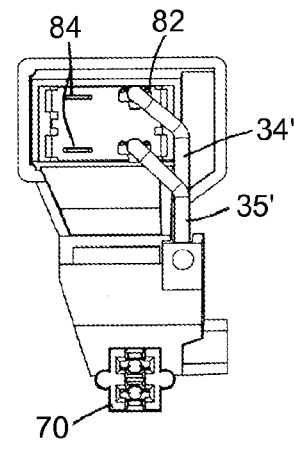
FIG. 10 is a bottom plan view of the module seen in FIG. 8.
Figure 11:
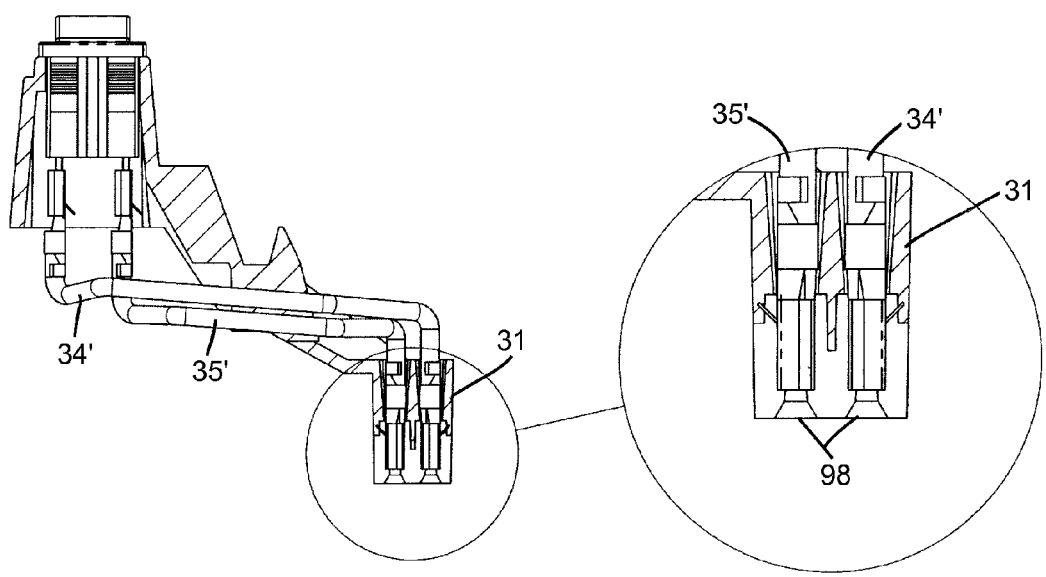
FIG. 11 is a cross-sectional view through section 11-11 of FIG. 8, with an enlargement of the terminal end.

FIG. 5 shows four alternative switches 80A, 80B, 80C, and 80D that can be used in a simpler switch module 30'. Each of these switches has two sets of terminals 82, 84. On two of the switches, the terminals are aligned in one direction, as seen in FIG. 9, and in the other two switches they are aligned in a perpendicular direction, as seen in FIG. 10. Two of the switches (80A and 80C) use a simple rocker actuator 56. The other two switches (80B and 80D) use rocker actuators 56' that are arranged to be fitted with an arm for remote actuation.

Just as with the switch in the arrangement seen in FIGS. 1-4, each of the four alternative switches seen in FIG. 5 fits with a cavity 90 in the switch housing 48'. In this case, one of the sets of switch terminals (84) is connected from an access side 72' (FIGS. 9 and 10) by two wires (not seen) directly to the power supply. Intermediary wires 34' and 35' connect the terminals on the second set of switch terminals 82 on the switch to terminals on the terminal end 31'. The wires extend trough a slot 39' that is, in this example, formed between a panel 40' and the frame 48' that holds the terminals 84 where the power is connected.

Connection of the Switch Module to the Winding Board

In both illustrated embodiments of the invention, the electrical leads on the terminal end 31 on the switch module 30 slidably connect to the lower terminal block 17 on the winding board 11 through the use of plug-and-socket connectors 98, best seen in FIG. 10. The lower terminal block that is shown here has a plug that slides into a socket on the terminal end 31. Other arrangements are possible. For example, the plug could be provided on the switch module 30, rather than on the winding board 11, and the socket could be provided on the winding board rather than on the switch module 30. Other types of mating plugs and sockets (including "hermaphrodite" connectors) could also be used. The use of a sliding connection, rather than a traditional terminal block connection to a plain wire, expedites the assembly process.

In this example, no other mechanical fasteners (such as screws) are needed to secure the switch module 30 to the winding board 11.

When the switch module 30 is connected to the lower terminal block 17 on the winding board 11, the electrical leads on the terminal end 31 electrically connect to the leads on the lower terminal block 17. This electrically connects the switch module 30 to the coils 13 in the motor 10 and enables power to flow from the power source to the windings when the switch is on and to be cut when the switch is off.

Assembly of the Other Components

The winding board 11 and the switch module 30 are mounted in a motor housing 90 (seen in FIG. 1) that helps to protect the motor 10. Generally, the housing has an inner housing 91 and an outer housing 92. The inner housing 91 houses the stator 12 and is shaped to fit around and secure the motor 10. The outer housing 92 contains and is disposed around the inner housing 91 and forms a ventilation chamber around the stator 12. In some situations, a single-piece motor housing may be used instead.

In both illustrated arrangements, the switch module 30 is mounted in an extension 93 on the periphery of the outer housing 92 that is shaped to hold the module. In this example, the walls of the motor housing are generally circular in cross section, but have a cube-like extension 93 that is configured to receive the switch housing 48 on the switch module. In the illustrated device, the extension has three outer walls 94 that are 1-1½ " tall and 1-2" wide and an interior support wall 95 that is approximately 1" tall and 1" wide. All of these four walls extend generally in one direction; that is, they are all generally parallel to the axis of the motor. In this case, the walls slope slightly, and are somewhat closer together near the switch 33 than they are away from the switch. During assembly, the switch housing 48 slides into these walls, with the interior support wall 95 fitting closely within the channel 54 that separates the switch housing from the outside wall 56 of the power inlet. These walls then hold and support four sides of the switch housing 48. A switch hole 96 on a perpendicular side of the extension is sized to accommodate the actuator 58 on the switch 33, allowing the lever to be accessed by a user.

In the first illustrated embodiment of the invention, positioning the power inlet 32 laterally between the terminal end 31 of the module 30 and the switch housing 48 helps to facilitate assembly while minimizing overall unit width. In the illustrated device, both the power inlet 32 and the terminal end 31 are accessed from the access ends 70, 72 that are seen facing upwardly in FIG. 1. Having the power inlet 32 spaced laterally outward from the terminal end 31, and having the access end 72 of the power inlet 32 axially offset from the access end 70 of the terminal end 31 may make it easier to connect the power supply to the power inlet 32 after the terminal end 31 is connected. Positioning the power inlet 32 laterally inward from the switch 33 helps to minimize the overall width of the unit.

While a specific embodiment of the invention has been illustrated and described, modifications may come to mind without significantly departing from the spirit of the invention. The scope of protection is only limited by the scope of the accompanying claims.

What is claimed is:

1. A motor assembly that has:
 a motor:
 a terminal that has winding board leads that lead to the motor;

a rigid switch module that has a terminal end that connects to the terminal;

module leads that are on the terminal end of the switch module and fasten to the winding board leads when the switch module is connected to the terminal;

a power frame that is on the switch module;

a set of electrical power leads that are mounted in the power frame and are adapted to receive a connector on an electrical cord;

a switch housing that is on the switch module and is integrally formed with a wall on the power frame;

a switch on the switch module that is electrically connected to both the module leads and to the power leads;

a panel on the switch module that is parallel to and spaced from a wall on the power frame, and forms one side of an open slot that has two open ends and an open side; and electrical wires that extend through the open slot from the switch to the power leads and to the module leads.

2. The motor assembly of claim 1, where the switch module also has a ground wire that extends from the power leads to the module leads.

3. A motor assembly that has:

a motor;

a terminal that has winding board leads that lead to the motor;

a rigid switch module that has a terminal end that connects to the terminal;

module leads that are on the terminal end of the switch module and fasten to the winding board leads when the switch module is connected to the terminal;

a power frame that is on the switch module;

a set of electrical power leads that are mounted in the power frame and are adapted to receive a connector on an electrical cord;

a switch housing that is on the switch module and is rigidly connected to a wall on the power frame; and a switch on the switch module that is electrically connected to both the module leads and to the electrical leads.

4. The motor assembly of claim 3, in which:

the power frame is positioned laterally between the terminal end and the switch housing.

5. The motor assembly of claim 3, in which:

the switch housing is separated from the terminal end by a channel;

the motor assembly has at least two walls and an interior support wall that are shaped to receive the switch housing, with the interior support wall fitting into the channel.

6. The motor assembly of claim 3, where the terminal is on one side of a winding board and is electrically connected to a motor terminal on the opposite side of the winding board.

7. The motor assembly of claim 3, in which the winding board leads and the module leads are plug and socket connectors.

8. A switch module as recited in claim 3, in which:

the power leads and the module leads are both accessed from a common direction, with the power leads being disposed at least ½" farther in that direction than the module leads.

\* \* \* \* \*